US006982625B2

(12) United States Patent
Chainer et al.

(10) Patent No.: US 6,982,625 B2
(45) Date of Patent: Jan. 3, 2006

(54) EVENT-RECORDER FOR TRANSMITTING AND STORING ELECTRONIC SIGNATURE DATA

(75) Inventors: Timothy J. Chainer, Mahopac, NY (US); Claude A. Greengard, Chappaqua, NY (US); Charles P. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/720,352

(22) Filed: Nov. 25, 2003

(65) Prior Publication Data

US 2004/0104823 A1 Jun. 3, 2004

Related U.S. Application Data

(60) Continuation of application No. 09/989,468, filed on Nov. 21, 2001, now Pat. No. 6,737,954, which is a division of application No. 09/233,487, filed on Jan. 20, 1999, now Pat. No. 6,525,672.

(51) Int. Cl.
*G05B 23/02* (2006.01)

(52) U.S. Cl. ..................... 340/3.3; 340/10.1; 340/3.31; 340/3.4; 340/436; 340/539.1; 340/903

(58) Field of Classification Search ............. 340/572.1, 340/436, 426.1, 901, 568.1, 902, 904, 425.4, 340/438, 903, 905, 825.36, 571, 10.1, 3.1, 340/825.49, 3.3; 701/35, 36, 24, 32
See application file for complete search history.

(56) References Cited

U.S. PATENT DOCUMENTS

| | | | | |
|---|---|---|---|---|
| 3,971,916 A * | 7/1976 | Moreno | ..................... | 235/61.7 |
| 4,007,355 A * | 2/1977 | Moreno | ..................... | 235/61.7 |
| 4,092,524 A * | 5/1978 | Moreno | ..................... | 235/419 |
| 4,102,493 A * | 7/1978 | Moreno | ..................... | 235/419 |
| 5,056,056 A * | 10/1991 | Gustin | ..................... | 364/900 |

(Continued)

*Primary Examiner*—Daryl C Pope
(74) *Attorney, Agent, or Firm*—Whitham, Curtis & Christofferson, P.C.; Stephen C. Kaufman

(57) ABSTRACT

An electronic event recorder for attachment to a vehicle is provided which can broadcast encrypted signature and data, thereby leaving behind an electronic version of a "fingerprint" in the event of an accident or traffic violation. The fingerprint, captured by an external data acquisition system or another vehicle so equipped, provides a history of events related to the vehicle. The event recorder is preferably integrated on a smart card and housed in a tamper proof casing. In a first mode of operation, monitoring stations along the roadways periodically send an interrogation signal, such as when radar detects that the vehicle is speeding. Upon receiving the interrogation signal the smart card transmits the vehicle's signature information to the monitoring station where it is time and date stamped along with the speed of the vehicle. In a second mode of operation, when a sensor detects a sudden or violent acceleration or deceleration, such as occurs during a collision, a smart card mounted in each car will exchange signature information automatically. This is particularly useful when the collision occurs in a parking lot when one of the hit vehicles is typically unattended.

13 Claims, 3 Drawing Sheets

U.S. PATENT DOCUMENTS 5,140,634 A * 8/1992 Guillou et al. ................ 380/23
5,159,629 A * 10/1992 Double et al. ................. 380/4
5,280,159 A * 1/1994 Schultz et al. .............. 231/382
5,459,304 A * 10/1995 Eisenmann ................. 235/380
5,465,079 A * 11/1995 Bouchard et al. ........... 340/576
5,471,193 A * 11/1995 Peterson et al. ............ 340/438
5,602,919 A * 2/1997 Hurta et al. .................. 705/65
5,790,427 A * 8/1998 Greer et al. ................ 364/556
5,815,093 A * 9/1998 Kikinis ....................... 340/937
5,917,433 A * 6/1999 Keillor et al. .............. 340/989
6,052,068 A * 4/2000 Price R-W et al. ......... 340/933
6,076,026 A * 6/2000 Jambhekar et al. ........... 701/35
6,076,028 A * 6/2000 Donnelly et al. ............. 701/45
6,141,611 A * 10/2000 Mackey et al. ............... 701/35
6,157,321 A * 12/2000 Ricci .......................... 340/902
6,512,455 B2 * 1/2003 Finn et al. ............... 340/572.1
6,525,672 B2 * 2/2003 Chainer et al. ............. 340/904
6,737,954 B2 * 5/2004 Chainer et al. .............. 340/3.3

* cited by examiner

EVENT-RECORDER FOR TRANSMITTING AND STORING ELECTRONIC SIGNATURE DATA

This application is a continuation of U.S. patent application Ser. No. 09/989,468 filed Nov. 21, 2001 U.S. Pat. No. 6,737,954, which is a division of U.S. patent application Ser. No. 09/233,487 filed Jan. 20, 1999, now U.S. Pat. No. 6,525,672.

BACKGROUND OF THE INVENTION

1. Field of the Invention

The present invention generally relates to an event driven transceiver and, more particularly, to an event recorder carried in a vehicle for transmitting electronic signature data or "fingerprints" and receiving and recording electronic signature data from like equipped vehicles or roadside stations upon the occurrence of an event, such as, for example, an accidental collision or a traffic violation.

2. Description of the Related Art

Recently, law enforcement agencies in certain jurisdictions have resorted to automated surveillance techniques as a method for catching drivers that violate traffic laws. The most notable form of automated surveillance involves placing a traffic camera on a stretch of highway or at stop light intersections aimed to capture an image of a vehicle's licence plate. The camera shutter is tripped when a vehicle speeds or runs a yellow or red light. The image is stamped with the time, date, speed of the vehicle obtained from radar, and the status of the traffic light if applicable. The image is then mailed to the registered owner of the vehicle along with a traffic citation. This type of automated surveillance system is passive in that it is essentially just a replacement for a police officer staked out at the scene. However, the offending vehicle provides no information or "signature" other than a picture and its licence plate number. Further, it is obviously impractical to provide this type of surveillance system at every intersection-or along every stretch of roadway or parking lot.

The above described surveillance system really has no practical application for say, recording the events of a hit and run accident, unless of course the offence occurs at a monitored point. Moreover, a vehicle involved in an accident does not purposely leave any signature of its involvement in the accident. The result is that hit and run accidents occur frequently, particularly in parking lots, where there is no driver in the parked car. Unless there is a witness to the accident willing to speak up or the driver of the offending vehicle leaves a note, there is no accountability for such an accident.

Similarly, many surveillance tasks such as monitoring the weight of trucks or identifying hazardous materials (HAZMATS) carried in the truck prior to entering tunnels or bridges are very intrusive and require that the truck be stopped periodically at highway weigh stations and physically inspected. This is a very time consuming task for law enforcement officers as well as an inconvenience for the drivers.

Therefore what is needed in the art is the ability to automatically verify that a vehicle took part in a specific event apart from an eyewitness as well as a method for authorities to monitor potentially hazardous vehicles on the highways.

SUMMARY OF THE INVENTION

It is therefore an object of the present invention to provide an event recorder, such as on a smart card, comprising a transceiver for transmitting and/or receiving signature data upon the occurrence of a triggering event.

It is yet another object of the present invention to provide a smart card which transmits signature information when interrogated by a monitoring station.

It is yet another object of the present invention to provide a smart card for carrying in a vehicle which exchanges signature information with a similar device carried in another vehicle when a collision occurs.

According to the present invention, an event recorder for attachment to a machine or vehicle, is provided which can broadcast an encrypted signature, thereby leaving behind an electronic version of a "fingerprint" of the machine or vehicle carrying the recorder. The fingerprint, captured by an external data acquisition system, provides a history of events related to the machine or vehicle.

In the preferred embodiment, the event recorder comprises a microcomputer, a memory, and a transceiver, preferably housed in a tamper resistant casing, for example as the casing described in U.S. Pat. No. 5,159,629. All of the necessary hardware components may be housed on a smart-card which is ideal for this purpose. The memory stored signature information about the vehicle such as, for example, the owner's name, licence plate, vehicle registration, etc. In the case of trucks or even ships, the memory may further contain information relating to the nature of the cargo, the weight, or the size of the vehicle. In a first mode of operation, monitoring stations along the roadways periodically send an interrogation signal, such as when radar detects that the vehicle is speeding. Upon receiving the interrogation signal the smart card transmits the vehicle's signature information to the monitoring station where it is time and date stamped along with the speed of the vehicle. This data can then be appropriately processed by the authorities. The signature information and/or the interrogation signal may be encrypted to protect the privacy of the driver from bystanders who may intercept the signature signal.

In a second mode of operation, when a sensor detects a sudden or violent acceleration or deceleration, such as occurs during a collision, an event recorder mounted in each car will begin transmitting its signature information and receiving and storing the other vehicle's signature information. In this mode signature information is automatically exchanged between the vehicles without driver interaction. This is particularly useful when the collision occurs in a parking lot when one of the hit vehicles is typically unattended.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
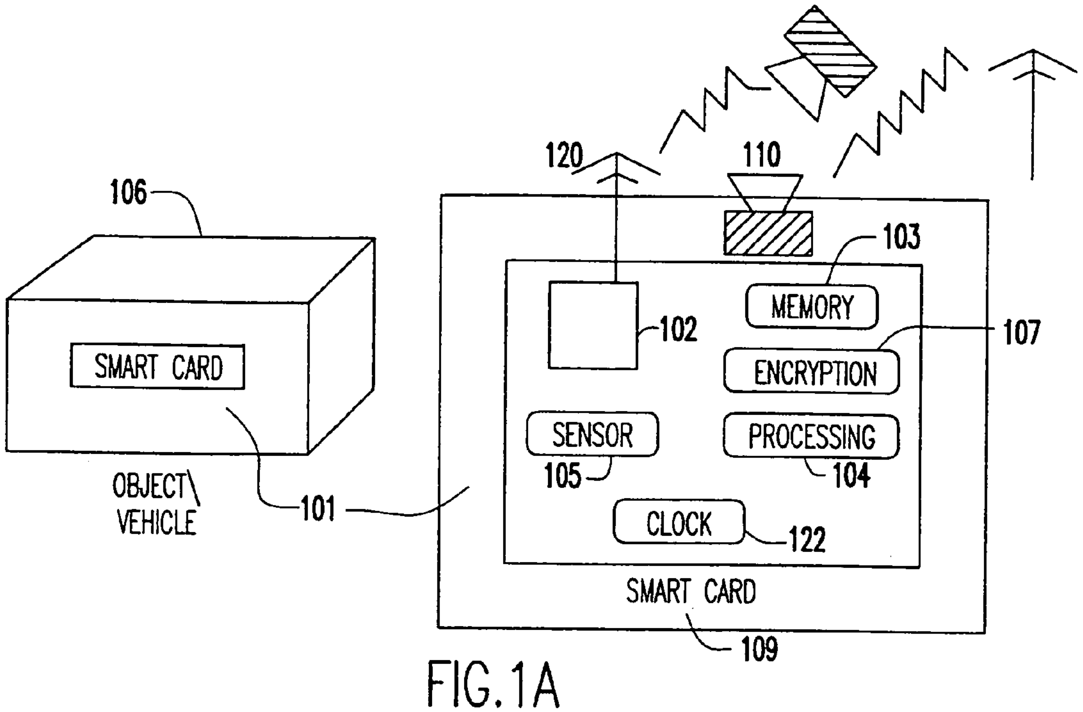
FIG. 1A is block diagram showing the event recorder according to the present invention integrated on a smart card.

Referring now to the drawings, and more particularly to FIG. 1A there is shown a system for transmitting and receiving signals when certain events occur. It provides the ability to verify that certain events have occurred by transmitting a digital signature and encrypted data to appropriate data acquisition systems, in effect leaving behind an "electronic" fingerprint which can be verified and authenticated. A block diagram of the system is shown in FIG. 1A. As shown, a device such as a smart card 101 is housed in a tamper-proof, destruction proof housing 106. Smart cards are disclosed for example in U.S. Pat. Nos. 3,971,916, 4,007,355, 4,092,524, and 4,102,493. Many such tamper-proof housings are known in the art which make it difficult to access the contents of the housing and/or make it evident that an attempt has been made to tamper with the housing. This would prevent owners from removing or disabling the devices. For example, tampering with the device may disable the vehicle. The smart card is powered by a small power source such as a battery 102 or the vehicle's electrical system. In addition to the typical components in a smart card, such as memory 103, processing units 104, and encryption module 107, the smart card is also connected to a sensor 105 or some number of sensors which can detect relevant information such as speed or acceleration and to a clock 122 which provides the date and the time. The smart card 101 is attached to a receiver 110 and a transmitter 120 which may be integrated onto the card or be discrete components. It is noted a smart card is but one possible configuration for the present invention and the configuration need not take the shape of an actual card.

Figure 1B:
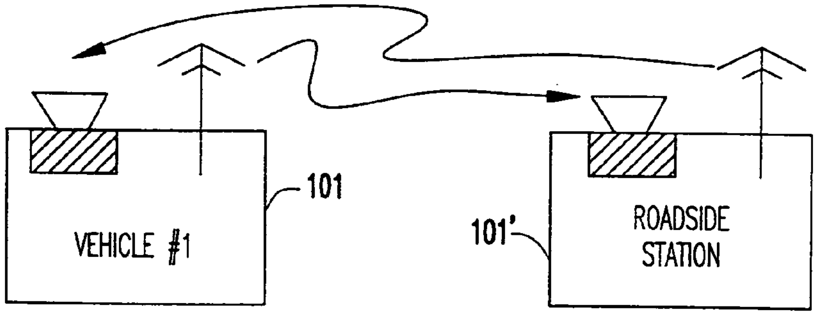
FIG. 1B is a block diagram showing the event recorder according to the present invention communicating between a vehicle an a roadside station.
Figure 2:
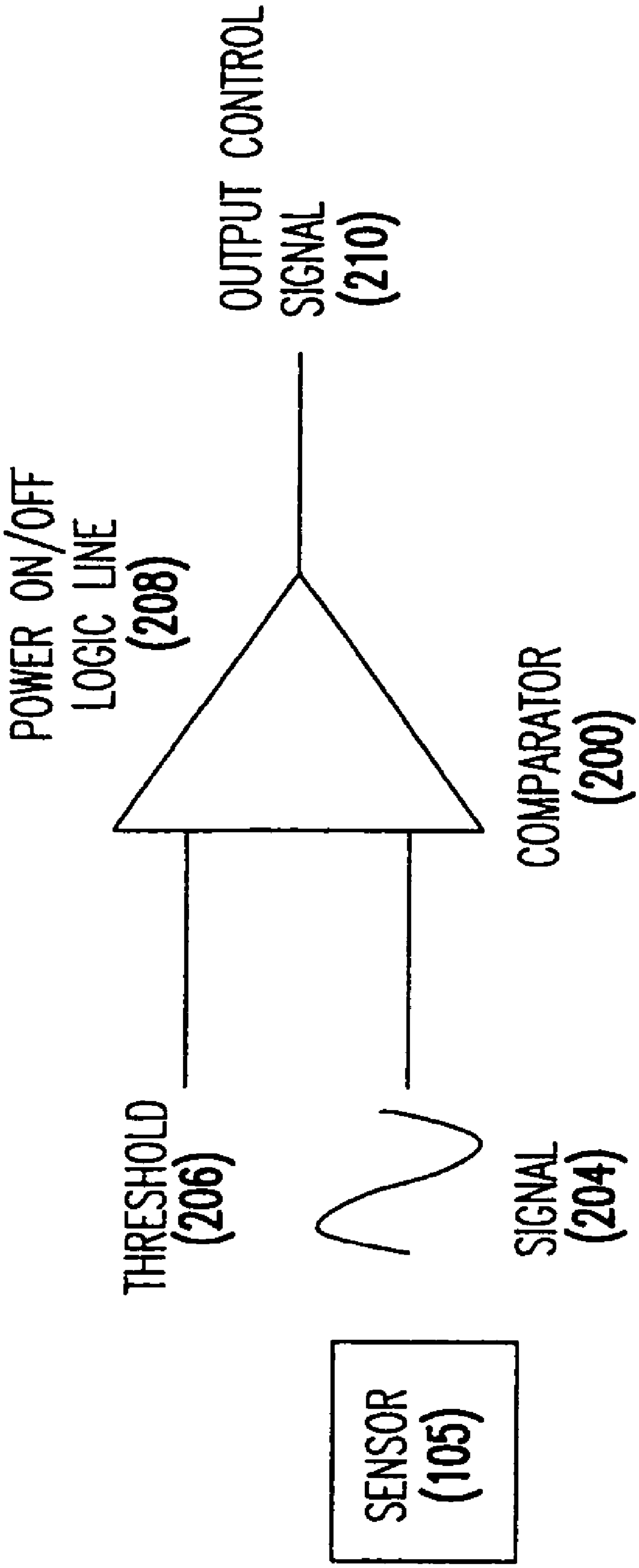
FIG. 2 is a schematic diagram showing a collision sensor.

Referring to FIG. 2, the sensors 105 (such as, for example the MURATA PDGS-001A-TC) are output to a comparator 200 such that when the output voltage of the sensor 105 exceeds a threshold 206, a collision with another vehicle is detected. In this event, the event recorder, triggered by the output sensor. 210, broadcasts encrypted signature data over the transmitter 120 and receives incoming signature data from the other vehicle so equipped with an event recorder 101' to be stored in the memory 103 for later analysis. The use of cryptography and digital signatures prevents falsifying records. The encryption module 107 can use any of the well-known (public or private) encryption algorithms such as RSA or DES. As shown in FIG. 1B, block 101' may be another smart card mounted in another vehicle or may be a roadside monitoring station.

It is important that the smart card from which signature data was received can be authenticated to ensure that the signature data has not been altered. Integrating the event recorder of the present invention in a smart card is advantageous since smart cards can be made authenticatable yet duplication resistant by employing zero-knowledge protocols. Zero knowledge protocols allow a smart card 101 to be authenticatable and yet be duplication resistant by allowing the verifying agent to convince him/herself that the smart card is authentic without the smart card revealing its authentication information. Such zero-knowledge protocols have been disclosed for instance in U.S. Pat. No. 5,140,634 to Guillou et al., herein incorporated by reference.

Figure 3:
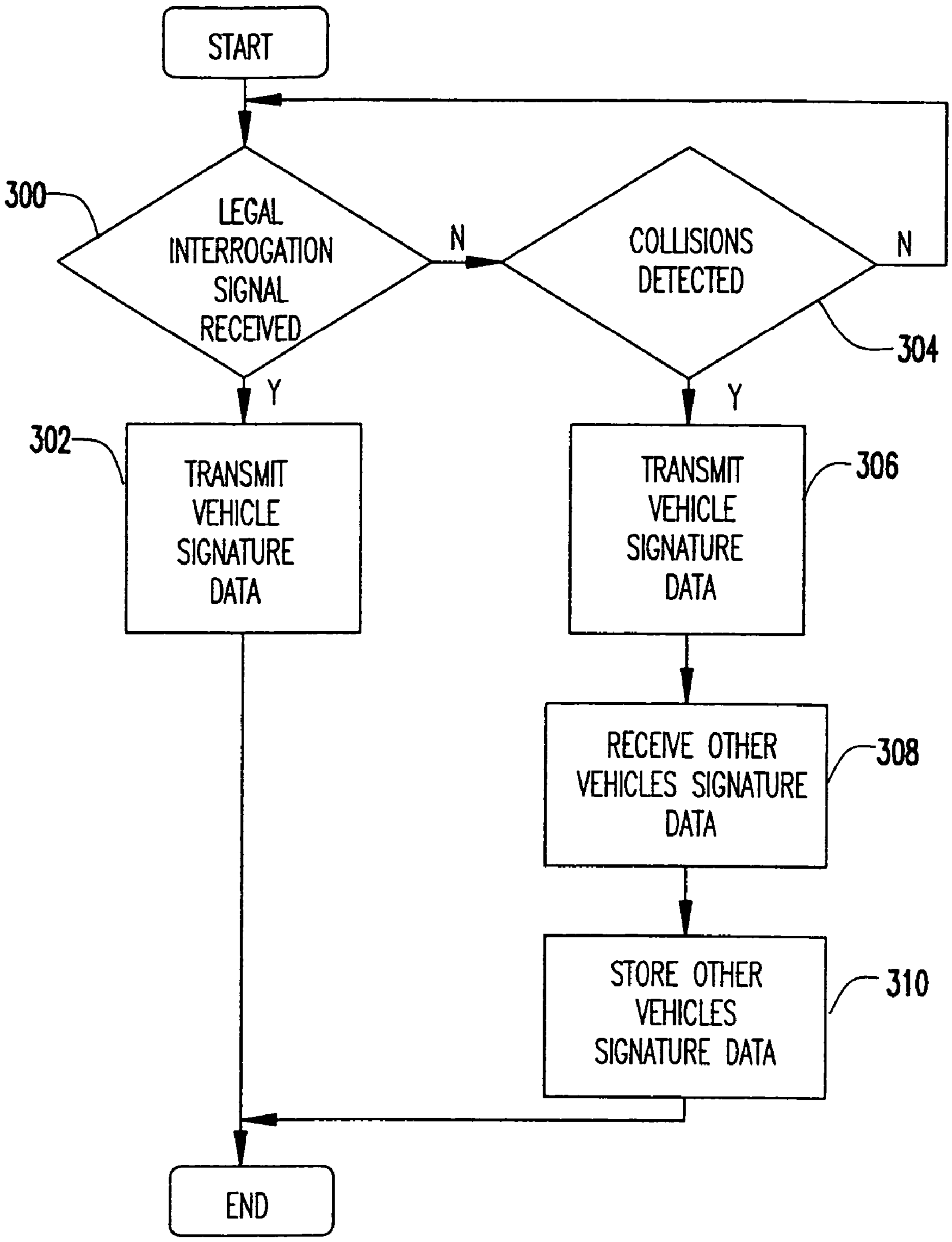
FIG. 3 is a flow diagram illustrating the operation of the event recorder.

Referring now to FIG. 3, there is shown a flow diagram illustrating the operation of the event recorder according to the present invention. In a first mode of operation, monitoring stations 101' along the roadways periodically send an interrogation signal, such as when radar detects that the vehicle is speeding. Upon receiving the interrogation signal and verifying that the signal is authentic or legal at block 300, the smart card transmits the vehicle's signature information to the monitoring station where it is time and date stamped along with the speed of the vehicle at block 302. This data can then be appropriately processed by the authorities. The signature information may be encrypted with the encryption circuitry 107 to protect the privacy of the driver from bystanders who may intercept the signature signal. In a second mode of operation, at block 304 if the sensor 105 detects a sudden or violent acceleration or deceleration, such as occurs during a collision, a smart card mounted in each car 101 and 130 will begin transmitting their respective signature information at block 306 and, at block 308, receiving the other's signature information. This information is stored at block 310 in the memory 103. In this mode signature information is automatically exchanged between the vehicles without driver interaction.

Figure 1C:
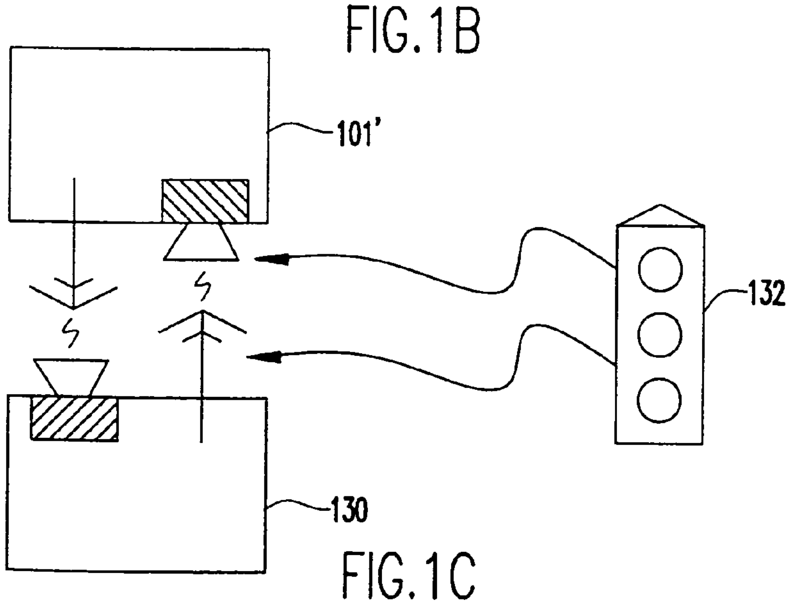
FIG. 1C showing the event recorder according to the present invention communicating between vehicles and an equipped traffic light.

In addition to identifying the vehicle registration, the signature may also include the vehicle's speedometer setting at the time of the collision and any other parametric data such as acceleration, temperature, and the status of the vehicle's lights, (e.g., headlights, stop lights, turn signals, etc.). Furthermore, as shown in FIG. 1C traffic lights 132 may also be equipped to transmit encrypted data such as the time, and state of the light (i.e., green, yellow or red) when prompted. This data is also received by both vehicles if they are close enough to the traffic light.

This would allow a better chance of precise analysis and reconstruction of the accident.

To limit speeding, the vehicle may continuously or intermittently broadcast its speed, or do so only when internally prompted or interrogated by a roadside station 101' as explained above to avoid saturation of RF channels, thereby simplifying and improving the detection of drivers who speed. This restriction could be imposed on all drivers, or only those drivers with a record of speeding.

A second application for this technology is the trucking industry. Today trucks are subjected to repeated "weight stations" to confirm cargo weight. These interruptions in the transport of goods are not cost effective. In this application the truck would be loaded and sealed with the event recorder such as described below.

1. The truck is loaded with a cargo.
2. The cargo data is input the event recorder by an authorized agent. The cargo data could include but is not limited to cargo contents, cargo weight, hazard level of the cargo, date of loading, loading location, and shipping location.
3. The cargo doors and the event recorder within its tamper resistant package 106 is physically locked onto the truck.
4. A sensor in the event recorder could sense the locking mechanism and enable the receiver 120 and transmitter 110.
5. As the truck is operated the event recorder then broadcasts an encrypted message on transmitter 110 of the contents of the truck container on time intervals determined by the microprocessor reading the output of the clock 122.

Alternatively the broadcasts could be prompted by an interrogation signal from a roadside station 101' detected by the vehicle 101.

The sensors in the event recorder would allow detection of tampering of the event recorder by measuring physical forces on the event recorder. Secondly, in some applications the sensors on the event recorder could directly measure the cargo, for example the cargo could contain radio frequency (RF) tags, such as those described in U.S. Pat. Nos. 5,280,159, to 5,280,159, which transmit signals detected by receiver 120 of the event recorder. Any attempt to tamper with the event recorder, the cargo or the lock would disable the transmitter and/or receiver.

The present allows weigh stations to be replaced by transceivers and would be faster and more frequent than today's manual methods. Further, the hazard level of material could be detected at entry into bridges and tunnels protecting the public from illegal transportation of hazardous materials. Any truck not transmitting a signal would be subject to manual inspection.

In a related field, application could be found in the shipping industry. Ships approaching ports could be required to transmit an encrypted signal containing information about the ship's origin and contents. This information could be used to improve control of the import and export of goods.

While the invention has been described in terms of a single preferred embodiment, those skilled in the art will recognize that the invention can be practiced with modification within the spirit and scope of the appended claims.

We claim:

1. An electronic event recorder for monitoring vehicles, comprising:

a memory for storing signature data related to a vehicle;

at least one sensor for sensing the occurrence of an event selected from the group consisting of tampering with the electronic event recorder, tampering with cargo associated with said vehicle, and tampering with locks associated with said vehicle;

at least one transmitter and receiver for transmitting said signature data and receiving data from a remote transmitter; and a microprocessor associated with said sensor, said memory, said at least one transmitter and said receiver, which, upon sensing said event, causes performance of one or more of the following causes the vehicle to be disabled, or causes said transmitter to stop transmitting said signature data to a remote receiver.

2. The electronic event recorder of claim 1 wherein said memory, said microprocessor, and said sensor are associated with a smart card.

3. The electronic event recorder of claim 1 wherein said at least one transmitter and receiver are integrated on a smart card.

4. The electronic event recorder of claim 1 wherein said memory, said microprocessor, said sensor, and said at least one transmitter and receiver are associated with a smart card.

5. The electronic event recorder of claim 1 wherein said sensor senses tampering with the electronic event recorder.

6. The electronic event recorder of claim 1 wherein said sensor senses tampering with cargo associated with said vehicle.

7. The electronic event recorder of claim 1 wherein said sensor senses tampering with locks associated with said vehicle.

8. The electronic event recorder of claim 1 wherein upon sensing the event, the microprocessor causes the vehicle to be disabled.

9. The electronic event recorder of claim 1 wherein upon sensing the event, the microprocessor causes said transmitter to stop transmitting said signature data to a remote receiver.

10. The electronic event recorder of claim 1 wherein upon sensing the event, the microprocessor causes the vehicle to be disabled and also causes said transmitter to transmit said signature data to said remote receiver.

11. The electronic event recorder of claim 1 wherein the signature data is encrypted.

12. The electronic event recorder of claim 1 further comprising a clock, said transmitter transmitting said signature data based on signals from said clock.

13. An electronic event recorder for monitoring vehicles, comprising:

a memory for storing signature data related to a vehicle;

at least one sensor for sensing the occurrence of tampering with the electronic event recorder;

at least one transmitter and receiver for transmitting said signature data and receiving data from a remote transmitter; and a microprocessor associated with said sensor, said memory, said at least one transmitter and receiver, which, upon sensing the occurrence of tampering with the electronic event recorder, causes performance of one or more of the following causes the vehicle to be disabled, or causes said transmitter to stop transmitting said signature data to a remote receiver, or causes said transmitter to transmit said signature data to said remote receiver.

* * * * *